3,505,069
PROCESS FOR MAKING SILVER HALIDE EMULSIONS

John Howard Bigelow, Rochester, N.Y., assignor to E. I. du Pont de Nemours and Company, Wilmington, Del., a corporation of Delaware
No Drawing. Filed Jan. 18, 1966, Ser. No. 521,449
Int. Cl. G03c 1/10, 5/00
U.S. Cl. 96—94
7 Claims

ABSTRACT OF THE DISCLOSURE

Preparation of light-developable, direct-writing silver halide emulsions by admixing a water-soluble silver salt with an aqueous acid solution of water-soluble chloride and a colloid binder and with a thiuram sulfide, e.g., monosulfide, disulfide, or tetrasulfide or a dithiocarbamate; ripening the precipitated silver chloride and adding 100–200 mole percent based on silver of a water-soluble bromide, digesting the silver chlorobromide emulsion and mixing it with a water-soluble copper or lead salt and a halogen acceptor. When in layers of oscillograph recording papers the emulsions yield images of high maximum density, greater stability against fading, high speeds and admit of rapid access.

---

This invention relates to light-developable, direct-writing, radiation-sensitive emulsions having improved sensitometric characteristics and to their preparation.

The process of making the light-developable, direct-writing, silver halide emulsions of this invention comprises (1) admixing an aqueous water-soluble silver salt, e.g., silver nitrate with an acidified aqueous solution of a water-siluble chloride containing a water-permeable organic colloid binding agent;

(2) adding thereto as a separate organic solvent solution or as an aqueous solution of the alkali metal or ammonium salt from 0.005 to about 2.0 mole percent based on the silver of. a compound selected from the group consisting of thiurams and dithiocarbamates, (3) ripening the precipitated silver chloride and adding thereto at ripening temperature, from 100 to 200 mole percent based on the silver of a water soluble bromide salt, (4) digesting the resulting silver chlorobromide emulsion and prior to completion of digestion or coating, mixing with the emulsion based on the silver, (a) a water-soluble salt of copper or lead in an amount of from 0.1 to 25 mol percent, and
(b) a halogen acceptor.

Suitable other water-soluble silver salts and water-soluble chlorides are listed in Maffet U.S. Patent 3,000.739, Sept. 19, 1961.

An important aspect of the process is that the thiuram or dithiocarbamate is admixed after precipitation of the silver chloride and either before or during the conversion of a substantial part of the silver chloride to silver bromide. The compound is added preferably from a solution containing the thiuram or dithiocarbamate. Thiurams or dithiocarbamates embody in their formula the structure

The following thiurams and dithiocarbamates are useful in the present invention:

Dipentamethylene thiuram tetra sulfide
Piperidinum penta methylene dithiocarbamate
Tetramethyl thiuram monosulfide
Dimethyl dithiocarbamic acid, sodium salt dihydrate
Diethyl ammonium diethyl dithiocarbamate
Dibenzyl dithiocarbamic acid zinc salt
Tetramethyl thiuram disulfide
Tetraethyl thiuram disulfide
Triphenyl tin N,N-dimethyl dithiocarbamate
Tetrabenzyl thiuram disulfide
Piperazinodithiocarbamic acid disodium salt hexahydrate
4-morpholine carbodithioic acid, sodium salt
Dimethyl dithiocarbamic acid dimethyl ammonium salt
Phenyl hydrazino carbodithioic acid ammonium salt
Diethyl dithiocarbamic acid, sodium salt trihydrate
Bis(2,6-dimethyl morpholino thiocarbonyl)monosulfide The precipitation may be effected with potassium chloride as the water-soluble chloride by slowly adding an aqueous solution of the water-soluble silver salt, e.g., $AgNO_3$, with or without a plumbous salt to an acidified solution of water-soluble chloride, e.g., KCl, containing a water-permeable organic colloid, e.g., gelatin. After the precipitation of silver chloride, there is added a solution of the thiuram or dithiocarbamate compound and the emulsion is then ripened at a temperature above 140° F. After ripening, the water-soluble bromide, preferably potassium bromide, is added as an aqueous solution while the emulsion is held at ripening temperature. After ripening and addition of soluble bromide, the emulsion may or may not be, but preferably is, washed in the manner described in Moede 2,772,165, Nov. 27, 1956. The emulsion is redispersed and digested in a conventional manner. At this point or prior to digestion, optical sensitizing dyes may be optionally added to increase the spectral response of the emulsion layer for use in instruments employing a variety of light sources. During this operation from 0.1 to 25 mole percent of a soluble plumbous or cupric salt and a halogen acceptor are added. The halogen acceptors, which may be used, comprise stannous chloride, salts providing, iodide and thiocyanate ions, molecular iodine, alkali-metal nitrites, phenylene diamines, aminophenols, hydroquinones, amine and amine salts, compounds with an alkaline reaction, such as borax, the hydroxides of alkali metals, ammonium hydroxide, 3- pyrazolidones, and other known halogen acceptors. The preferred halogen acceptors for this invention are stannous chloride and the combination of iodide and thiocyanate ions. In general, from 0.5 to 120 mole percent and preferably 5 to 40 mole percent of a stannous salt based on the silver may be used or 0.2 to 2.0 mole percent each of potassium iodide and potassium thiocyanate may also be used.

After the digestion step, the usual coating adjuvants, e.g., hardeners, wetting agents, etc., are added and the viscosity is adjusted by addition of more gelatin and/or other water-permeable colloids. The prepared emulsion is then coating on a suitable support, e.g., paper, and dried to give a dry coating weight equivalent to about 30 mg. $AgBr/dm.^2$.

To determine the sensitometric characteristics of the material it may be exposed through a power of 2 step wedge in an electronic flash sensitometer similar to that described by Wycoff and Edgerton, Journal of the Society of Motion Picture and Television Engineers, 66, 474 (1957). This instrument uses a xenon discharge tube as the source of radiation and has available exposure times of 10 and 100 microseconds. The exposed material may be light developed by irradiation under a cool white or daylight fluorescent lamp at about 95 foot-candles intensity. To determine the densities of the image and background, a reflection densitometer may be used whose values correspond to visual density. To test the stability of the light-developed image and the background, the exposed and light-developed material was continuously exposed to the above fluorescent lighting for 3 days. The image access time ratings given in the examples are arbitrary ratings in which 1 is the lowest time necessary to see the light-developed image.

emulsion was dried in a conventional manner. An emulsion not containing the above dithioic acid derivative was also made following the above procedure to provide a control for testing.

The following sensitometry, image access time and stability were obtained:

| Sample | Method No. 1 [1] | | | Method No. 3 [2] | | | Light-developed Stability [3] | | | |
|---|---|---|---|---|---|---|---|---|---|---|
| | | | | | | | Percent | | | |
| | $D_{max}$ | Bkgd. | Total Dens. | $D_{max}$ | Bkgd. | Total Dens. | Inc. Total Dens. | Inc. $D_{max}$ | Rating | Access [1] |
| Contains 0.2 mol percent 4-morpholine carbodithioc acid, sodium salt. | .34 | .28 | .62 | 1.08 | .15 | 1.23 | 131 | 103 | Good | 1 |
| Control contains no 4-morpholine carbodithioic acid, sodium salt. | .34 | .28 | .62 | 1.08 | .05 | 1.13 | 90 | 50 | Fair | 2 |

[1] Expose on Edgerton, Germeshausen and Grier VI Sensitometer at 0.001 sec. through a power of 2 step wedge. Light develop by irradiation from daylight fluroescent lamps at an intensity level of 50 ft. candles for 4 min. Read densities on reflection densitometer.
Total dens.=$D_{max}$ plus background densities.
Background=Dens. difference between white paper and light developed sample.
$D_{max}$=Dens. Difference between background and maximum density.
[2] Exposure as in (1) but do not light develop. Develop 1 min. at $68_x$ F. in a conventional paper developer. Fix 2 to 5 min. in a conventiooonal fixer. Wash and dry. Read densities on densitometer.
Background=Dens. difference between white paper and unexposed, wet processed sample.
$D_{max}$=Dens. difference between background and maximum density.
Total dens.=$D_{max}$ plus background densities.
[3] Expose on Edgerton, Germeshausen and Grier Mark VI Sensitometer at 0.001 sec. and light-develop under daylight fluorescent light at 95 ft. candles.
Compare $D_{max}$ and total dens. ($D_{max}$ plus background dens.) of samples light-developed 3 days vs. 5 min.
Compare $D_{max}$ and total dens. ($D_{max}$ plus background dens.) of samples light-developed 3 days vs. 5 min.
[4] Samples are exposed on Edgerton, Germeshausen and Grier Mark VI sensitometer at 0.001 sec. and light-developed under daylight fluorescent light at 95 ft. candles. An arbitrary rating of access time is applied in which 1 is fastest.

The invention will be further illustrated by but is not limited to the following examples.

EXAMPLE I

A gelatino-silver chlorobromide emulsion was made by slowly adding an aqueous solution containing 1 mole of silver nitrate and 0.033 mole of plumbous nitrate to a gelatin solution containing 1 mole of potassium chloride and acidified with 0.05 mole of hydrochloric acid. The precipitation was carried out under a red safelight. The temperature at precipitation and for 40 minutes thereafter was held at 160° F. After precipitation, an aqueous solution of 0.002 mole of the sodium salt of 4-morpholine carbodithioic acid is then added and an aqueous solution of 1.6 moles of potassium bromide is added while the mixture was held at 160° F. The resulting emulsion was coagulated, washed and redispersed in a manner similar to that described in Moede U.S. 2,772,165.

A mixture of the redispersed emulsion, gelatin necessary to provide about 9% concentration for coating, and an optical sensitizing dye was digested for 20 minutes at 130° F. After digestion, 0.01 mole of potassium iodide, 0.2 mole of potassium thiocyanate, 0.6 mole of potassium bromide, and 0.02 mole of plumbous nitrate per mole of silver bromide were added and the mixture cooled to coating temperature. Coating aids and chrome alum were added and, after adjusting the pH to 3.5 and adjusting to suitable viscosity, the emulsion was coated on a paper support to give a dry coating weight equivalent to 30 mg. of silver bromide per square decimeter. The coated

EXAMPLE II

Example I was repeated except:
(1) No $Pb(NO_3)_2$ was present at precipitation.
(2) Precipitation temperature was 140° F. instead of 160° F.
(3) 0.002 mole of dimethyl dithiocarbamate sodium salt was added in place of 4-morpholine carbodithioic acid, sodium salt after the silver chloride precipitation.

The following sensitometry, image access time and stability were obtained:

| Sample | Method No. 1 | | | Method No. 3 | | | Photolyzed Stability | | | |
|---|---|---|---|---|---|---|---|---|---|---|
| | | | | | | | Percent | | Image Stability Rating | Access |
| | $D_{max}$ | Bkgd. | Total Dens. | $D_{max}$ | Bkgd. | Total Dens. | Total Dens. | $D_{max}$ | | |
| Contains 0.2 mol percent dimethyldithiocarbamate sodium salt. | .25 | .24 | .49 | 1.20 | .06 | 1.26 | 103 | [1] 71 | Good | 2 |
| Control contains no dimethyldithiocarbamate sodium salt | .22 | .24 | .46 | 1.20 | .10 | 1.30 | 117 | 58 | Fair | |

[1] In light-developed image stability measurements, a high percent $D_{max}$ is more desirable tham high percent total dens. because this indicates better contrast.

EXAMPLE III

Example I was repeated except:
(1) Use a range of concentration of piperidinium pentamethylene dithiocarbamate as indicated in the following table instead of 4-morpholine carbodithioic acid, sodium salt.

The following light-developed image stability was obtained:

| Mol percent piperidinium pentamethylene dithiocarbamate | Percent | | Stability Image Rating |
|---|---|---|---|
| | Total Dens. | $D_{max}$ | |
| 0.005 | 87 | 75 | Fair. |
| .02 | 115 | 110 | Good. |
| 0.2 | 112 | 123 | Do. |
| 1.0 | 112 | 142 | Do. |
| 2.0 | 121 | 171 | Do. |
| Control | 43 | 14 | Poor. |

EXAMPLE III-A

Gelatino-silver chlorobromide emulsions were made by slowly adding an aqueous solution containing one mole of silver nitrate and 0.033 mole of lead nitrate, $Pb(NO_3)_2$, to a gelatin solution containing 1 mole of potassium chloride acidified with 0.05 mole of hydrochloric acid. The precipitations were carried out under a red safelight. The temperature at precipitation and for 40 minutes thereafter was held at 160° F. After precipitation, a range of concentrations of from 0.005 to 2.0 mole percent of piperidinium pentamethylene dithiocarbamate and an aqueous solution of 1.6 mole of potassium bromide were added while the mixtures were held at 160° F. The resulting emulsions were coagulated, washed and redispersed as described in Moede 2,772,165. Mixtures of the redispersed emulsions, gelatin necessary to provide about 9% concentrations for coating, a sensitizing due, 0.02 mole of $Pb(NO_3)_2$, 0.6 mole of KBr and 0.02 mole $SnCl_2$ per mole of AgBr were digested for 20 min. at 30° F. After digestion, the mixtures were cooled to coating temperature, borax was added as a buffer, coating aids and chrome alum were added and after adjusting pH to 4.0, and adjusting to suitable coating viscosity, the emulsions were coated on paper supports to give dry coating weights equivalent to 30 mg. of AgBr per square decimeter. The coatings were dried in a conventional manner. The material was exposed and light-developed and the following data were obtained:

| Mol percent piperidinium pentamethylene dithiocarbamate | Percent Total Dens. | $D_{max}$ | Stability Image Rating |
| --- | --- | --- | --- |
| 0.005 | 52 | 46 | Fair to poor. |
| 0.02 | 72 | 85 | Fair. |
| 0.2 | 71 | 79 | Do. |
| 0.5 | 88 | 114 | Good. |
| 2.0 | 84 | 158 | Do. |
| 0.000 (Control) | 44 | 35 | Poor. |

EXAMPLE IV

Example I was repeated except add the amount of material specified in the following table instead of 4-morpholine carbodithioic acid, sodium salt. The following image access times [1] were obtained:

[1] Samples are exposed on Edgerton, Germeshausen and Grier Sensitometer at 0.001 sec. and light-developed under cool white fluorescent lamp at 95 ft. candles. An arbitrary rating of access time is assigned in which 1 is fastest.

| Material Added | Amont, mol percent | Relative Access Time |
| --- | --- | --- |
| Piperazinodithiocarbamic acid, disodium salt hexahydrate | 0.2 | 1 |
| Do | 0.05 | 1 |
| Dimethyl dithiocarbamic acid, sodium salt dihydrate | 0.02 | 1 |
| Do | 0.01 | 2 |
| Piperidinium pentamethylene dithiocarbamate | 0.2 | 1 |
| Do | 0.1 | 2 |
| Do | 0.02 | 2 |
| Do | 0.005 | 2 |
| Dipentamethylene thiuram tetra sulfide | 0.05 | 1 |
| Do | 0.01 | 1 |
| Tetramethyl thiuram monosulfide | 0.05 | 2 |
| Tetramethyl thiuram disulfide | 0.2 | 2 |
| Do | 0.05 | 2 |
| Bis (2, 6-dimethyl morpholinothiocarbonyl) disulfide | 0.02 | 2 |
| Diethyl ammonium diethyl dithiocarbamate | 0.2 | 2 |
| Do | 0.01 | 2 |
| Dibenzyl dithiocarbamic acid zinc salt | 0.01 | 2 |
| Control | | 3 |

EXAMPLE V

Example I was repeated except add 0.0005 mole of piperazino dithiocarbamic acid disodium salt or 0.002 mole of dimethyl dithiocarbamic acid sodium salt instead of 4-morpholine carbodithioic acid, sodium salt. The following sensitometry, access time and stability were obtained:

| Variation | Method No. 1 [1] | | | Method No. 3 [2] | | | Image Stability Percent | | Rating | Access |
| --- | --- | --- | --- | --- | --- | --- | --- | --- | --- | --- |
| | $D_{max}$ | Bkgd. | Total Dens. | $D_{max}$ | Bkgd. | Contrast [3] | Total Dens. | $D_{max}$ | | |
| 0.05 mol percent piperazino dithiocarbamic acid disodium salt. | .35 | .26 | .61 | 1.15 | .16 | 33.6 | 107 | 69 | Good | 1 |
| 0.2 mol percent dimethyl dithiocarbamic acid sodium salt. | .36 | .30 | .66 | 1.19 | .11 | 26.5 | (Not meas.) | | Good (Visually) | 1 |
| Control | .32 | .28 | .60 | 1.08 | .05 | 10.8 | 90 | 50 | Fair | 2 |

[1] See sub-note 1 of Example I.
[2] See sub-note 2 of Example I.
[3] Contrast=100X (Reciprocal of total number of steps between dens.=1.0 and 0.04). This method is designed so that the greater the contrast, the larger the number.

Stannous chloride may be added from aqueous solutions, particularly when such solutions are made using the anhydrous stannous compound.

Where it is desired, other halides or combination of halides may be used to form the silver halide grains. For example, pure silver chloride or pure silver chlorobromide may be used. Where soluble chloride salts are used it is desirable because of solubility differences, to form the silver halide grains of desired composition and size and then add sufficient soluble bromide salts to provide the desired concentration of bromide ions.

The role of the thiuram and dithiocarbomate compounds when added before or during bromide conversion and before crystal formation is complete is not fully understood. However, it is believed that the presence of one or more of the compounds controls the crystal formation during conversion which results in a stable, low density background and a stable, high density, quickly accessible image. As indicated above the thiuram and dithiocarbonate compounds exhibit their beneficial effect either in emulsions which do not have a plumbous salt present at precipitation of the silver chloride or in emulsions which do have a plumbous salt incorporated in the system at precipitation of the silver chloride as taught by the Bigelow Patent 3,178,293.

In place of the gelatin binding agent used in the foregoing examples there can be substituted other material or synthetic water-permeable organic colloid binding agents, including those listed in Hunt 3,033,678.

Suitable supports for the novel photographic emulsions of this invention includes those used in the prior art for light-writing and oscillographic recording. The preferred support is photographic grade paper but may be a hydrophobic film composed of a cellulose ester, e.g., cellulose acetate or a polymer, e.g., the film supports disclosed in Alles et al. U.S. Patent 2,627,088 and Alles U.S. Patent 2,779,684.

The novel process of this invention produces light-developable, direct writing, photosensitive emulsion layers and elements having several advantages over the prior art products. The emulsion layers and elements upon exposure to high-intensity radiation and subsequent light-development, yield images of high maximum density and greater stability against image fading than are obtainable with direct writing elements known heretofore. In addition to being extremely convenient to use because wet chemical processing can be eliminated, it is also adaptable to conventional chemical development where desired. The invention also provides an element wherein one may subject the exposed material to relatively high illumination for long periods of time or use the material to reproduce photographically the image record using high-intensity exposing radiation without serious image deterioration.

The elements made in accordance with this invention have high photographic speed and permit rapid access to the recorded image. The elements may be processed as described in Hunt 3,033,678 and Bigelow 3,178,293.

The embodiments of the invention in which an exclusive property or privilege is claimed are defined as follows:

1. A process for making light-developable, direct-writing silver halide emulsions which comprises
   (1) admixing an aqueous water-soluble silver salt with an acidified aqueous solution of a water-soluble chloride containing a water-permeable organic colloid binding agent;
   (2) admixing therewith from 0.005 to about 2.0 mole percent based on the silver of a thiuram monosulfide, disulfide, or tetrasulfide, or a dithiocarbamate compound containing a structure of the formula

and then
   (3) ripening the precipitated silver chloride and adding thereto at ripening temperature from 100 to 200 mole percent based on the silver of a water soluble bromide salt,
   (4) digesting the resulting silver chlorobromide emulsion and prior to completion of digestion or coating mixing with the emulsion based on the silver,
      (a) a water-soluble salt of copper or lead in an amount from 0.1 to 25 mole percent, and
      (b) a halogen acceptor.

2. A process according to claim 1 wherein an aqueous alkali metal salt solution of the thiuram or dithiocarbamate solution is used in step (2).

3. A process according to claim 1 wherein the water-soluble silver salt is silver nitrate.

4. A process according to claim 1 wherein said water-soluble chloride is potassium chloride.

5. A process according to claim 1 wherein said colloid is gelatin.

6. A process according to claim 1 wherein said thiuram compound is a tetramethyl thiuram sulfide.

7. A process according to claim 1 wherein the water-soluble salt of lead is admixed during step (1).

References Cited

UNITED STATES PATENTS 3,178,293  4/1965  Bigelow _____ 96—108
3,287,137  11/1966  McBride _____ 96—107

OTHER REFERENCES

Grant: 3rd edition, Hackh's Chemical Dictionary, 1955 (McGraw-Hill Book Co. Inc., New York, p. 854).

NORMAN G. TORCHIN, Primary Examiner
R. E. FICHTER, Assistant Examiner